United States Patent [19]

Friswell et al.

[11] Patent Number: 5,156,653
[45] Date of Patent: Oct. 20, 1992

[54] SILENT MARKERS FOR PETROLEUM, METHOD OF TAGGING, AND METHOD OF DETECTION

[75] Inventors: Michael R. Friswell, Wayne, N.J.; Richard B. Orelup, Destin, Fla.

[73] Assignee: Morton International, Inc., Chicago, Ill.

[21] Appl. No.: 687,255

[22] Filed: Apr. 18, 1991

[51] Int. Cl.$^5$ ............................................. C10L 1/18
[52] U.S. Cl. ................................... 44/328; 252/11; 252/50; 252/51
[58] Field of Search ................ 44/328; 252/11, 50, 252/51; 8/662

[56] References Cited

U.S. PATENT DOCUMENTS

| | | | |
|---|---|---|---|
| 2,519,868 | 8/1950 | Zehner et al. | 252/11 |
| 3,476,500 | 11/1969 | Litke | 8/662 |
| 3,494,714 | 2/1970 | Litke | 8/662 |
| 4,009,008 | 2/1977 | Orelup | 252/50 |
| 4,082,501 | 4/1978 | Mees et al. | 44/328 |
| 4,209,302 | 6/1980 | Orelup | 44/328 |
| 4,735,631 | 4/1988 | Orelup | 44/328 |
| 4,764,290 | 8/1988 | Currey | 252/11 |

FOREIGN PATENT DOCUMENTS 1368727 10/1974 United Kingdom .

*Primary Examiner*—Jacqueline Howard
*Attorney, Agent, or Firm*—Wayne E. Nacker; Gerald K. White

[57] ABSTRACT

Liquid petroleum products are marked with markers having the formula:

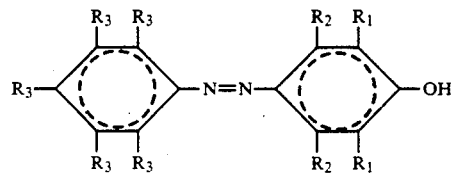

wherein the $R_1$'s and the $R_2$'s are the same or different and are each selected from —H and $C_1$–$C_7$ alkyls; provided that at least one, and preferably both, $R_1$'s are a $C_3$–$C_7$ alkyl; and provided that the $R_3$'s are the same or different and are selected from —H, —NO$_2$, —Cl, —Br, —F, —CN, and —Me; and provided that at least one $R_3$ is selected from —NO$_2$, —Cl, —Br, —F, and —CN.

16 Claims, No Drawings

SILENT MARKERS FOR PETROLEUM, METHOD OF TAGGING, AND METHOD OF DETECTION

The present invention is directed to the tagging of petroleum products with silent markers and to detection of such markers in petroleum products.

BACKGROUND OF THE INVENTION

It is known to tag petroleum products with markers, as for example as taught in U.S. Pat. Nos. 4,209,302 and 4,735,631, the teachings of each of which are incorporated herein by reference.

A dye is defined herein as a material lending visible color when dissolved in the dyed product. Examples of dyes which have been used for dyeing organic liquids are Color Index Solvent Red #24, Solvent Red #19, Solvent Yellow #14, Solvent Blue #36, and Solvent Green #3.

A marker is defined herein as a substance which can be dissolved in a liquid to be identified, then subsequently detected by performing a simple chemical or physical test on the tagged liquid. Markers that have been proposed, or are in use, include furfural, quinizarin, diphenylamine and radioactive materials. (Radioactive materials have not been accepted in Western countries because of special equipment and precautionary measures associated with their handling.)

Dyes and markers are needed to clearly distinguish chemically or physically similar liquids As one example, fuels are dyed or tagged to provide visually distinctive brand and grade denominations for commercial and safety reasons. As another example, some lightly taxed products are dyed or tagged to distinguish them from similar materials subject to higher taxes. Furthermore, certain fuels are dyed or tagged to deter fraudulent adulteration of premium grade products with lower grade products, such as by blending kerosene, stove oil, or diesel fuel into regular grade gasoline or blending regular grade gasoline into premium grade gasoline. Identification of particular batches of bulk liquids for protection against theft is another valuable function of markers and dyes, particularly for identifying fuels owned by large government, military or commercial consumers. Finally, marketers of brand name products dye or tag their products to detect substitution of others' products in their distribution system.

Dyes alone are not always adequate to securely and reliably identify liquids. Many dyes are easily removed by unauthorized persons. Furthermore, dyes can be obscured by other natural or added substances (particularly dyes present at low concentrations in a mixture of fuels). Because dyes alone have these shortcomings, a combination of a dye and a marker often is used to tag an organic liquid.

Above-referenced U.S. Pat. No. 4,735,631 recites important characteristics of certain desirable markers for petroleum include:
1. are entirely foreign to the liquids;
2. can be supplied as highly concentrated solutions in compatible solvents;
3. are easily detected by a simple field test;
4. are not obscured by unstable natural components of the liquids;
5. are stable over the anticipated storage life of the tagged liquid (usually three to six months); and
6. have identities which can be confirmed by laboratory methods.

The dyes of the present invention fulfil requirements of 1-6 above. The markers of the present invention are "silent" in that at the levels at which they are used, they provide substantially no color to the petroleum product, but undergo a reaction during a detection procedure. The silent nature of the markers of the present invention make them particularly suitable as markers in non-dyed petroleum products, but they are suitable in dyed petroleum products, as well, where the markers do not alter the color imparted by the dyes. The silent nature of the markers of the present invention also is advantageous in that they cannot be detected without an appropriate reactive extraction system (or reaction subsequent to extraction), making misuse or dilution of a petroleum product mixed with a marker of the present invention more difficult.

Markers of the present invention are also advantageous is that they provide relatively quantitative determinations. Most markers are adequate for detection of their presence in petroleum product; however, many available markers do not provide a good quantitative measurement of their levels in liquid petroleum products. Quantitative determinations are particularly important in cases where dilution is suspected, e.g., dilution of a higher-taxed fuel with a lower-taxed fuel.

SUMMARY OF THE INVENTION

In accordance with the present invention, liquid petroleum products are tagged with a marker of the general class of chemicals described as phenylazophenols. Markers at levels of about 0.25 parts per million (ppm) or above (usually at least about 1 ppm) are added to liquid petroleum products. The markers may be detected in the petroleum products by extraction with a reagent comprising water and a water-soluble amine, and, preferably a water-miscible cosolvent. This reagent system not only extracts the marker from the liquid petroleum product, but causes the marker to react or complex, producing a clearly defined color that identifies the petroleum product as to source, permitted use, etc.

The present invention further provides novel compounds particularly suitable as markers for petroleum products.

DETAILED DESCRIPTION OF CERTAIN PREFERRED EMBODIMENTS

The markers of the present invention have the general formula

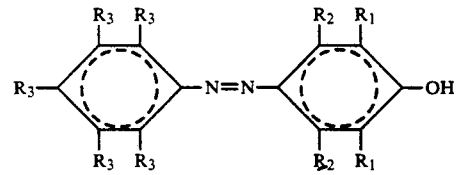

wherein the $R_1$'s and the $R_2$'s are the same or different and are each selected from —H and $C_1$–$C_7$ alkyls, provided that at least one, and preferably both, $R_1$'s are a $C_3$–$C_7$ alkyl; and providing that the $R_3$'s are the same or different and are selected from —H, —$NO_2$, —Cl, —Br, —F, —CN, and —Me, provided that at least one R is selected from —$NO_2$, —Cl, —Br, —F, and —CN. Preferably, both $R_2$'s are H and both $R_1$'s are $C_3$–$C_7$ alkyl. Most preferably, the alkyl groups which are at the $R_1$ positions are primary or secondary alkyls; compounds having tertiary alkyl groups as $R_1$ groups are less suitable markers. It is to be noted in the above general formula that the —OH group of the phenol moiety is para to the azo group. If the —OH is ortho to the azo group, the compound does not effectively function as a marker. However, the markers of the present invention may contain ortho or meta isomers as impurities that are not detrimental to the markers.

Suitable, but not preferred, specific known markers in accordance with the present invention are given in the table below:

TABLE

| COMPOUND | CAS NO. | DEVELOPED COLOR |
|---|---|---|
| Phenol, 2,6-bis(1,1-dimethylethyl)-4-[(4-nitrophenyl)azo] | 20012-59-3 | Blue |
| Phenol, 2,6-di-tert-butyl-4-[(o-nitrophenyl)azo] | 33349-14-3 | Blue red |
| Phenol, 2,6-di-tert-butyl-4-[(m-nitrophenyl)azo] | 33349-15-4 | Red |
| Phenol, 2,6-di-tert-butyl-4-[(2,6-dinitrophenyl)azo] | 33349-20-1 | Green blue |
| Phenol, 2,6-bis(1,1-dimethylethyl)-4-[(2,4-dinitrophenyl)azo] | 33349-21-2 | Green blue |
| Phenol, 4-[(4-chlorophenyl)azo]-2,6-bis(1,1-dimethylethyl) | 29879-57-0 | Orange red |
| Phenol, 2-(1-methylpropyl)-4-[(4-nitrophenyl)azo] | 2724-84-7 | Red |
| Phenol, 5-methyl-2-(1-methylethyl)-4-[(4-nitrophenyl)azo] | 15331-57-4 | |
| Phenol, 5-methyl-2-(1-methylethyl)-4-[(2-nitrophenyl)azo] | 52183-19-4 | Red |
| Phenol, 2-(1,1-dimethylethyl)-4-[(4-nitrophenyl)azo] | 84156-43-4 | Red |
| Phenol, 2,6-bis(1-methylethyl)-4-[(4-nitrophenyl)azo] | 20012-57-1 | Blue |
| Phenol, 4-[(2-nitrophenyl)azo]-2,6-dipropyl | 43109-15-5 | Blue red |
| Phenol, 4-[(4-nitrophenyl)azo]-2,6-dipropyl] | 43109-18-8 | Blue |
| Phenol, 2,6-bis(1-methylethyl)-4-[(2-nitrophenyl)azo] | 521833-36-5 | |

It is to be noted that the developed colors in the above table, and developed colors discussed hereinafter, are dependent to some extent on the extractant and development solution discussed hereinbelow, and may vary somewhat from the listed color depending upon the solution used.

One of ordinary skill in the art, using the preceding generic disclosure and specific examples as a guide, can determine other species within the scope of the present invention. Mixtures of species are also contemplated to be within the scope of the present invention.

To be a particularly suitable commercial marker in accordance with the present invention, there are characteristics which the marker should have, which characteristics are particularly sensitive to the substituent groups in the general formula above. The markers of the general formula above exist as solids. Generally, users of such markers prefer that the markers be in liquid form. Accordingly, it is desirable to provide the markers in concentrated solutions, e.g., 20 wt. percent or above, in petroleum-miscible solvents In commercial liquids the marker is dissolved in a petroleum solvent, particularly a high-boiling point aromatic solvent, such as xylene. By high-boiling is meant herein a solvent having a B.P. of about 200° C. or above. The substituent groups of the marker are found to have a very significant impact on the solubility of the markers in such solvents. In selecting appropriate markers from the phenylazophenols, it has been found that compounds which may appear to be very similar chemically may have very different solubilities in the types of solvents used to carry these compounds into petroleum fuels. While a large number of compounds of this class can be used to tag petroleum, those compounds which have the most commercial utility are those which can be sold as concentrated solutions in petroleum solvents. Furthermore, the markers must be developable to produce a color which is clearly distinguishable from any color imparted by extracted petroleum impurities. To this end, particularly suitable markers according to the present invention were developed within the general formula set forth above but having the more specific formula:

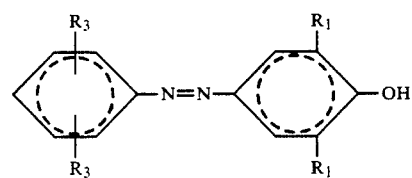

wherein the $R_1$'s are each primary or secondary butyl, preferably secondary butyl, and the $R_3$'s are the same or different and are selected from —H, —$NO_2$, —Cl, —Br, —F, —CN and —Me, provided that at least one of the $R_3$'s is selected from —$NO_2$, —Cl, —Br, —F and —CN. Preferably at least one $R_3$ is —$NO_2$, most preferably para to the azo group.

Specific examples of the novel markers in accordance with the invention are:

| MARKER | DEVELOPED COLOR |
|---|---|
| Phenol, 2,6-bis(1-methylpropyl)-4-[(4-nitrophenyl) azo]- | Blue |
| Phenol, 2,6-bis(1-methylpropyl)-4-[(3-nitrophenyl) azo]- | Red |
| Phenol, 2,6-bis(1-methylpropyl)-4-[(2-nitrophenyl) azo]- | Bronze |
| Phenol, 2,6-bis(1-methylpropyl)-4-[(3-nitro-4-chloro-phenyl) azo]- | Red |
| Phenol, 2,6-bis(1-methylpropyl)-4-[(2-chloro-5-nitrophenyl) azo]- | Magenta |
| Phenol, 2,6-bis(1-methylpropyl)-4-[(2,4-dinitro-phenyl) azo]- | Blue |
| Phenol, 2,6-bis(1-methylpropyl)-4-[(2-chloro-4-nitrophenyl) azo]- | Blue |
| Phenol, 2,6-bis(1-methylpropyl)-4-[(3,4 dichloro-phenyl) azo]- | Red |
| Phenol, 2,6-bis(1-methylpropyl)-4-[(4-chloro-phenyl) azo]- | Yellow |
| Phenol, 2,6-bis(1-methylpropyl)-4-[(4-nitro-3-chloro-phenyl) azo]- | |
| Phenol, 2,6-bis(1-methylpropyl)-4-[(2,5 dichloro-phenyl) azo]- | |

These compounds are synthesized by azo coupling of an appropriately substituted aniline to a 2,6 dibutyl phenol (preferably a 2,6 disecbutyl phenol).

A closely related group of particularly suitable, novel markers have the general formula:

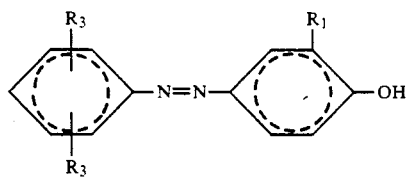

wherein $R_1$ is a primary or secondary amyl or mixture of primary and/or secondary amyl isomers or a primary or secondary hexyl or mixture of primary and/or secondary hexyl isomers, and the $R_3$'s are the same or different and are selected from —H, —$NO_2$, —Cl, —Br, —F, —CN and —Me, provided that at least one of the $R_3$'s is selected from —$NO_2$, —Cl, —Br, —F and —CN. Preferably at least one $R_3$ is —$NO_2$, most preferably para to the azo group. Specific examples of the novel markers in accordance with the invention are phenol, n-hexyl-4-(4-nitro-phenyl azo)- and phenol, n-amyl-4-(4-nitro phenyl azo)-.

The final amount of marker in the tagged liquid petroleum product will depend upon a variety of factors. For most common detection methods, it is usually considered advisable to have at least about 0.25 ppm in the finally tagged liquid petroleum product. Usually, however, a somewhat greater amount will be provided, e.g., 5-40 ppm, enabling the marker to be detected, should the tagged petroleum product be diluted in untagged petroleum product. It is generally desirable to provide an amount of marker that might be detected in a simple field test. Of course, where sophisticated testing equipment is available, it may be possible to use even less marker.

It is known that phenylazophenols may be extracted from azophenols using a strong alkali which forms a sodium or potassium salt with the phenolic hydroxide. However, extraction using a strong aqueous alkali solution is not a preferred extraction and detection method. The color developed from the markers of the present invention with strong alkalis is not as intense as might be desired. Furthermore, the color developed with strong alkali is unstable, reducing the ability to obtain quantitative determinations.

In accordance with a specific extraction method of the present invention, detection of the marker in a tagged petroleum product is effected using an extraction mixture which also develops an intense color by reaction or complexion with the marker. The extraction mixture comprises between about 10 and about 60 volume percent water, between about 10 and about 60 volume percent of an water-soluble amine and up to about 60 volume percent of a cosolvent which is miscible in aqueous media and substantially immiscible in petroleum product.

The reaction or complexation of the amine (and cosolvent) with the marker is not fully understood. The reaction or complexation is known, however, to perform two functions. First, the reaction or complexation results in the solvent-soluble marker being rendered soluble in aqueous medium, and thereby extractable in aqueous medium. Secondly, the reaction or complexation develops the color.

Suitable amines include water-soluble alkyl amines, such as butyl amine, water-soluble alkoxy amines, such as methoxy propyl amine, aminopropyl morpholine, and methoxy ethoxy propylamine and mixtures thereof. The oxygenated amines, and particularly methoxy ethoxy propylamine, are preferred for extractive power and low odor. Because of their odor, alkyl amines are generally less preferred.

Although extraction and development may be accomplished simply using an aqueous solution of a water-soluble amine, it is found that cosolvents, particularly oxygenated cosolvents, which are miscibled with water and immiscible with the petroleum product, have significantly advantageous effects with respect to shade and intensity of the developed color and the degree of interference from fuel components. Importantly, the developed color is stable, e.g., for a day or more, facilitating relatively quantitative determination of marker levels.

Suitable co-solvents include alcohols, such as ethyl alcohol; glycols, such as ethylene glycol, diethylene glycol, propylene glycol, dipropylene glycol, polyethylene glycol, polypropylene glycol; glycerine; esters, such as methyl lactate, ethyl lactate and butyl lactate; sulfolane; dimethyl sulfoxide (DMSO), and dimethylformamide (DMF). Preferred solvents are the more oxygenated materials, such as glycerine, diethylene glycol and polyethylene glycol 300 and mixtures thereof. The cosolvent is preferably used at a level of about 30 volume percent.

If the extraction mixture does not use a cosolvent, it is preferred that an alkoxy amine be used, rather than a alkyl amine.

As a simple field test, a suitable volume of the aqueous extractant mixture is mixed with a suitable volume of the liquid petroleum to be tested. Typically the volume ratio of extraction mixture to liquid petroleum is between about 1:1 and about 1:10. If marker is present in the petroleum product, it will be extracted by the aqueous layer and colored by reaction with the extraction mixture. Colorometric equipment may be used to quantify the amount of marker in the aqueous layer. As long as similar conditions, e.g., volume-to-volume, ratios are used for similar liquid petroleum products, the color that is produced is relatively quantitative. The test is not "quantatative" in the strict sense that exact levels of marker can be tested in tagged petroleum. This is due in large part to the nature of petroleum products which are mixtures of a wide variety of compounds. Depending upon the particular batch of petroleum product, the level of impurities extractable by the extraction solution may vary. However, in tests conducted according to the present invention, it is generally possible to determine marker levels to within about 5%.

One of the advantages of the invention is the simplicity of the qualitative test afforded by the markers and extraction/development solutions. Experience has indicated that inspectors in the field are often adverse to performing all but the most simple tests. The test as indicated above is a quick, one-step test. Convenience can be enhanced by providing an inspector a premeasured amount of extractant solution in an extraction vial and, preferably, means to measure an appropriate amount of petroleum product. For a rough estimate of marker level, the inspector might even be provided with a color chart against which to compare the developed color.

Another particular advantage of the present invention is that a family of markers is provided, in which are markers that provide a variety of different colors. All of the markers can be extracted and developed with the same solution. Sometimes, the same or very similar petroleum products will be subject to a multi-tiered tax structure, in which case, the petroleum product at each tier of the tax structure may be tagged with a different marker. Also, the marker may be changed from time to time to make it more difficult to circumvent tax laws.

An extraction mixture which also produces the color reaction is the most convenient method of marker detection. It may be understood, however, that extraction in a non-reactive extraction medium followed by a reaction mixture could also be utilized.

The invention will now be described in greater detail by way of specific examples.

EXAMPLE 1

Phenol, 2,6-bis(1-methylpropyl)-4-[(4-nitrophenyl)azo]-

To 3L reaction flask, was charged 250 gm concentrated sulfuric acid (94-96%) onto 100 gm ice plus 400 ml water. With agitation, 140 gm p-nitroaniline (anhydrous) was added. The mixture was stirred to dissolution. The reaction mass was cooled to 0° C. with additional ice. 70 gm $NaNO_2$ (100%) equivalent was added as solution under the reaction surface. The temperature was maintained at 0°-6° C. during addition. The mixture was stirred to negative sulfone reagent test.

To the diazo, 227 gm 2,6 di-sec butyl phenol dissolved in 500 gm of an aromatic solvent was added. Then was added in portions, 300 gm sodium formate, with ice to maintain the temperature at 8°-10° C. The reaction progress was monitored with an appropriate indicator solution. Once coupling was complete, the organic phase was separated from the aqueous phase. The organic layer consisted of liquid tracer dye having a comparative color value of 18-20% of Solvent Yellow 107.

This compound when added to petroleum product can be extracted as a tag with an appropriate reagent giving a bluish-black color having a typical absorbance maxima of 592 nanometers.

EXAMPLE 2

Phenol, 2,6-bis(1-methylpropyl)-4-[(3-nitrophenyl)azo]-

This compound is produced as in Example 1, except that p-nitroaniline was replaced with 140 gms of m-nitroaniline. From this marker, a scarlet red extractant layer results, with a typical absorbance maxima of 515 nanometers.

EXAMPLE 3

Phenol, 2,6-bis(1-methylpropyl)-4-[(3-nitro-4-chloro-phenyl)azo]-

This compound was produced as in Example 1, except that p-nitroaniline was replaced with a molar equivalent of 3-nitro-4-chloro-aniline, diazotized and coupled as previously described. When extracted, a bluish-red extractant layer results, having a typical absorbance maxima of 522-525 nanometers.

EXAMPLE 4

Phenol, 2,6-bis(1-methylpropyl)-4-[(2,4-dinitro-phenyl)azo]-

To a 5 liter round bottom 4-neck flask, 873 gm of 97% sulfuric acid was charged With external cooling, 70 grams of sodium nitrite was added in portions over a 30 minute period. Addition temperature was 18°-30° C. Once addition was completed, the temperature was raised slowly to 70°-75° C. The finished nitrosyl sulfuric acid was totally clear. The reaction flask was cooled immediately with dry ice. Diazotization was carried out by adding 215 gm (approximately 86% purity) of 2,4 dinitro aniline to the stirring mass in portions to a negative sulphone reagent test. Diazotization was carried out at 18°-21° C. with temperature control by dry ice addition.

When diazotization was completed, the mass was drowned onto 1500 gm of ice, and coupler solution of 216 gm 2,6 disecbutyl phenol (84-85% 2,6 isomer ratio by HPLC analysis) dissolved in 167 gm of n-hexyl alcohol was added. Exotherm was controlled to 10° C. with ice addition. Added, portion-wise, was 600 gm initially of sodium formate. Final aqueous phase pH was 0.3-0.4 units. The mass was stirred overnight or to a negative diazo test with appropriate reagent.

350 gm of a high-flash aromatic solvent, i.e., Exxon Aromatic 200, was added. The mass was heated to 65°-70° C. The aqueous phase was separated from the organic layer. The organic layer was subsequently dehydrated by azeotrope and stripping distillation. The resultant product yield was 1800 gm of material with a characteristic absorption maxima of 622-625 nm (extractant color).

EXAMPLE 5

Phenol, 2,6 Disecbutyl-4(3,4 Dichloro Phenyl Azo)-

A.

To a 5 liter 4-neck round bottom flask, was charged 700 cc water and 290 gm of concentrated hydrochloric acid (approximately 36%). The solution was heated to 70°-75° C. and added portion-wise was 174 gm of 3,4 dichloro aniline. The mixture was heated to 90° C. and held until a clear solution of the hydrochloride was obtained. The mass was cooled to 5°-10° C. with ice addition.

B. Diazotization

Under the reaction surface, 70 gm equivalent of sodium nitrite was added as a 40% solution Rapid uptake of the nitrite solution occured within 10-15 minutes. The mixture was stirred at the end to a negative sulphone reagent test. Diazotization temperature was 2°-5° C.

C. Coupling

A coupling solution was prepared of 216 gm 2,6 disecbutyl phenol dissolved in 400 gm of a high flash aromatic type solvent. This was added immediately to the diazo solution. While the temperature was controlled with ice addition, 140 gm of sodium formate was added. Final aqueous pH of coupling was 3.0-3.5 units.

D.

Work up was per Example 1, but with no addition of aromatic solvent. Yield was approximately 1400 gm of product with a characteristic developed wavelength of 505 nm.

EXAMPLE 6

Phenol, 2,6 Disecbutyl-4-(2-Nitro Phenyl Azo)

The same procedure was produced as in Example 2, except 140 gm of o-nitroanaline was substituted in each case as the aromatic amine charge. Yield was approximately 1000 gm of product, with a characteristic developed wavelength of approximately 508-510 nm.

EXAMPLE 7

Phenol, 2,6 Disecbutyl-4-(2-chloro-4-Nitro Phenyl Azo

A. Diazotization

To a 5 liter neck flask was charged 534 gms of 92% sulfuric acid. This was heated to 50° C. Added, in portions, was 134 gm 2-chloro-4-nitro aniline. This was heated to 85° C. to a totally clear solution. This was then cooled to 75° C. and drowned onto 1000 gm of fresh ice. Temperature was now −2 to +2° C. Diazotization was at 0°–3° C. with 21 gm sodium nitrite as a 40% solution to a negative sulphone test.

B. Coupling

A solution of 216 gm 2,6 Disechutyl Phenol in 400 gm of a high flash aromatic type solvent was prepared. This was added to the diazo charge while controlling the temperature with ice. Added was 400 gm sodium formate. Final aqueous phase pH was 0.4–0.6. Work up was the same as Example 5. The yield was 1750 gm product having a developed absorbance maxima of 620 nm.

EXAMPLE 8

Phenol, 2,6 Di Sec Butyl-4-(2-Chloro-5-Nitro Phenyl Azo)-

To a 3 liter round bottom 4-neck flask was charged 100 grams of water. Then with stirring, 36 grams of 2-chloro-5-nitro aniline was added. Once the material was completely hydrated, 0.5 mole concentrated hydrochloric acid was added.

EXAMPLE 9

Phenol, 2,6 Di Sec Butyl-4-(2,5 Dichloro Phenyl Azo)-

The same procedure as Example 8 was followed, except 32.8 grams of 2,5 Dichloro aniline was used. 215 grams of material was obtained with a characteristic (extraction) wavelength of 510 nanometers.

EXAMPLE 10

Phenol, 2-Hexyl-4-(4-Nitro-Phenyl Azo)-0.4 Mole Coupling

To a 3 liter 4-neck round bottom flask was charged 1 mole of concentrated hydrochloric acid and ice to hold the temperature to between −10° C. and 0° C. To the stirring mass was added a slurry consisting of 60 grams p-nitro aniline, 28 grams sodium nitrite solid and 150 grams water. This was stirred until a negative sulphone reagent test was achieved. Then 70 grams hexyl phenol dissolved in 70 grams of xylene was added. To this was added, portion-wise, 60 grams sodium acetate. The mass was stirred, holding the temperature at 8°–10° C. until a negative diazo test was achieved. Workup was as previously described, but all solvent was stripped. The mass was brought to 60% non-volatile content with 1/1 mixture of p-nonyl phenol/Suresol 190. Approximately 400 grams of finished product with a characteristic (extractant) wavelength of 512 nanometers.

EXAMPLE 11

Phenol, 2-Amyl-4-(4-Nitro Phenyl Azo)-

This was synthesized as Example 10, except 60 grams of amyl phenol as coupling component was substituted. 375 grams of finished product was obtained with a characteristic (extractant) wavelength of 510–515 nanometers.

EXAMPLE 12

Phenol, 2,6 Di Sec Butyl-4-(4-Chloro Phenyl Azo)-

To a 3 liter 4-neck round bottom flask is charged 1 mole of concentrated sulfuric and 200 ml of water. To a beaker is charged 300 ml of water and 65 gm of p-chloro aniline. This is heated to complete dissolution and added with stiring to acid. The material is cooled down with ice to 0°–5° C. Diazotization is with 28 gm sodium nitrite (100) diluted to approximately 40% solution; this is added to a very slightly positive sulphone reagent test. Coupling is with 87 gm 2,6 di sec butyl phenol dissolved in 86 gm of Aromatic 200 solvent (Exxon). Then, portion-wise, is added 60 gm sodium acetate. The mass is stirred at 8°–10° C. until a negative diazo test is achieved. After workup, approximately 400 gm of finished product is obtained.

EXAMPLE 13

Phenol, 2,6 Di Sec Butyl-4-(2 Methyl-4-Nitro Phenyl Azo)-

Synthesis is as in Example 12, but substituting 64 gm 2-methyl-4-nitro aniline.

EXAMPLE 14

One kilogram of phenol, 2,6 disecbutyl-4-(4-nitro phenyl azo)- is added to 1000 liters of diesel fuel. This mixture is added to petroleum pumped into a storage tank to a total volume of petroleum of approximately 100,000 liters. The concentration of phenol, 2,6 disecbutyl-4-(4-nitro phenyl azo)- is calculated to be 20-ppm.

A reagent mixture containing (by volume) 30 parts water, 30 parts diethylene glycol and 40 parts methoxy ethyoxy propylanine is prepared. 10 ml of the reagent mixture is transferred to a glass sample vial. 90 ml of the diesel fuel from the storage tank is added to the reagent in the sample vial, and the vial is vigorously shaken. The mixture separates into an upper petroleum phase and a lower aqueous phase. A blue color develops in the aqueous phase, confirming the presence of phenol, 2,6 disecbutyl-4-(4-nitro phenylazo)- in the marked petroleum.

EXAMPLE 15

One Kilogram of phenol, 2,6 disecbutyl-4-(4-nitro phenyl azo)- is added to 1000 liters of diesel fuel. This mixture is added to petroleum pumped into a storage tank to a total volume of petroleum of approximately 100,000 liters. The concentration of phenol, 2,6 disecbutyl-4-(4-nitro phenyl azo)- is calculated to be 20 ppm.

A reagent mixture containing (by volume) 30 parts water, 30 parts diethylene glycol and 40 parts methoxy ethoxy propylamine is prepared. 10 ml of the reagent mixture is transferred to a separatory funnel. 20 ml of the diesel fuel from the storage tank is added to the reagent in the separatory funnel, and the separatory funnel is vigorously shaken. The mixture separates into an upper petroleum phase and a lower aqueous phase. A blue color develops in the aqueous phase, confirming the presence of phenol, 2,6 disecbutyl-4-(4-nitro phenyl azo)- in the marked petroleum.

To quantify the amount of phenpl, 2,6 disecbutyl-4-(4-nitro phenylazo)-, the aqueous phase is separated from the petroleum phase. A de-emulsifier, specifically Reagent HX sold by Morton International, is added to the aqueous phase to break the emulsion of any emulsified petroleum within the aqueous phase. The aqueous phase is then emptied into a syringe with an attached "Sep-Pak C-18" cartridge sold by Waters Associates Bedford, Mass. to remove all traces of petroleum. The sample is examined at 592 nm in a double beam spectrophotometer. The absorbance is compared to a standard calibration curve prepared for this marker. The observed value of 20 ppm conforms to the level of the marker originally added to the petroleum tank.

While the invention has been described in terms of certain preferred embodiments, modifications obvious to one with ordinary skill in the art may be made without departing from the scope of the present invention.

Various features of the invention are set forth in the following claims.

What is claimed is:

1. A composition comprising a liquid petroleum product and a detectable level of a marker having the formula:

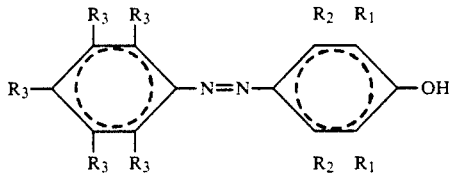

wherein the $R_1$'s and the $R_2$'s are the same or different and are each selected from —H and $C_1$–$C_7$ alkyls; provided that at least one $R_1$ is a $C_3$–$C_7$ alkyl; provided that the $R_3$'s are the same or different and are selected from —H, —NO$_2$, —Cl, —Br, —F, —CN, and —Me; and provided that at least one $R_3$ is selected from —NO$_2$, —Cl, —Br, —F, and —CN.

2. The composition according to claim 1 wherein said marker is present at a level of at least about 0.25 ppm.

3. The composition according to claim 1 wherein said marker is present at a level of at least about 5 ppm.

4. A composition according to claim 1 wherein both of said $R_2$'s and three of said $R_3$'s are —H and said $R_1$'s are each n-butyl or secbutyl.

5. A method of marking a liquid petroleum product comprising adding to said liquid petroleum product a detectable level of a marker having the formula:

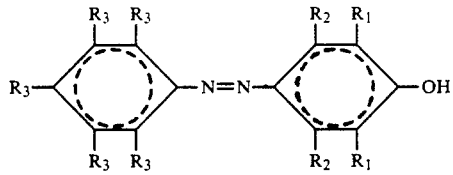

wherein the $R_1$'s and the $R_2$'s are the same or different and are each selected from —H and $C_1$–$C_7$ alkyls; provided that at least one $R_1$ is a $C_3$–$C_7$ alkyl; provided that the $R_3$'s are the same or different and are selected from —H, —NO$_2$, —Cl, —Br, —F, —CN, —Et and —Me; and, provided that at least one $R_3$ is selected from —NO$_2$, —Cl, —Br, —F, and —CN.

6. The method according to claim 7 wherein said marker is added at a level of at least about 0.25 ppm.

7. The method according to claim 7 wherein said marker is added at a level of at least about 5 ppm.

8. A method according to claim 5 wherein both of said $R_2$'s and three of said $R_3$'s are —H and said $R_1$'s are each n-butyl or secbutyl.

9. A method of marking a liquid petroleum product and identifying petroleum product so marked, the method comprising adding to said liquid petroleum product a detectable level of a marker having the formula:

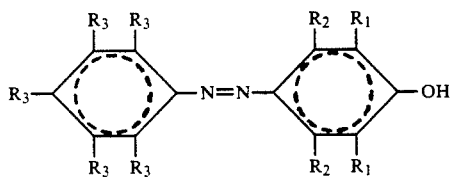

wherein the $R_1$'s and the $R_2$'s are the same or different and are each selected from —H and $C_1$–$C_7$ alkyls; provided that at least one $R_1$ is a $C_3$–$C_7$ alkyl, provided that the $R_3$'s are the same or different and are selected from —H, —NO$_2$, —Cl, —Br, —F, —CN, —Et and —Me; and provided that at least one $R_3$ is selected from —NO$_2$, —Cl, —Br, —F, and —CN, and subsequently identifying said marker in said liquid petroleum product.

10. A method according to claim 9 wherein both of said $R_2$'s and three of said $R_3$'s are —H and said $R_1$'s are each n-butyl or secbutyl.

11. A method in accordance with claim 9 wherein said marker is identified in said liquid petroleum product by extracting said product from said liquid petroleum product and simultaneously or subsequently reacting said marker to develop a color.

12. A method in accordance with claim 9, wherein said marker is reacted with a mixture of water and a water-soluble amine.

13. A method in accordance with claim 12 wherein said amine is an alkyl amine or an alkoxyamine.

14. A method in accordance with claim 12 wherein said mixture also contains an oxygenated cosolvent.

15. A method according to claim 14 wherein said cosolvent is selected from the group consisting of alcohols, glycols, glycerine, esters, sulfolane, dimethyl sulfoxide, dimethyl formamide, and mixtures thereof.

16. A method in accordance with claim 12 wherein said amine is selected from the group consisting of methoxy propyl amine, aminopropyl morpholine, methoxy ethoxy propylamine, and mixtures thereof.

* * * * *